No. 897,527.
A. ENSOR.
TOY.
APPLICATION FILED MAR. 30, 1908.
PATENTED SEPT. 1, 1908.
2 SHEETS—SHEET 2.
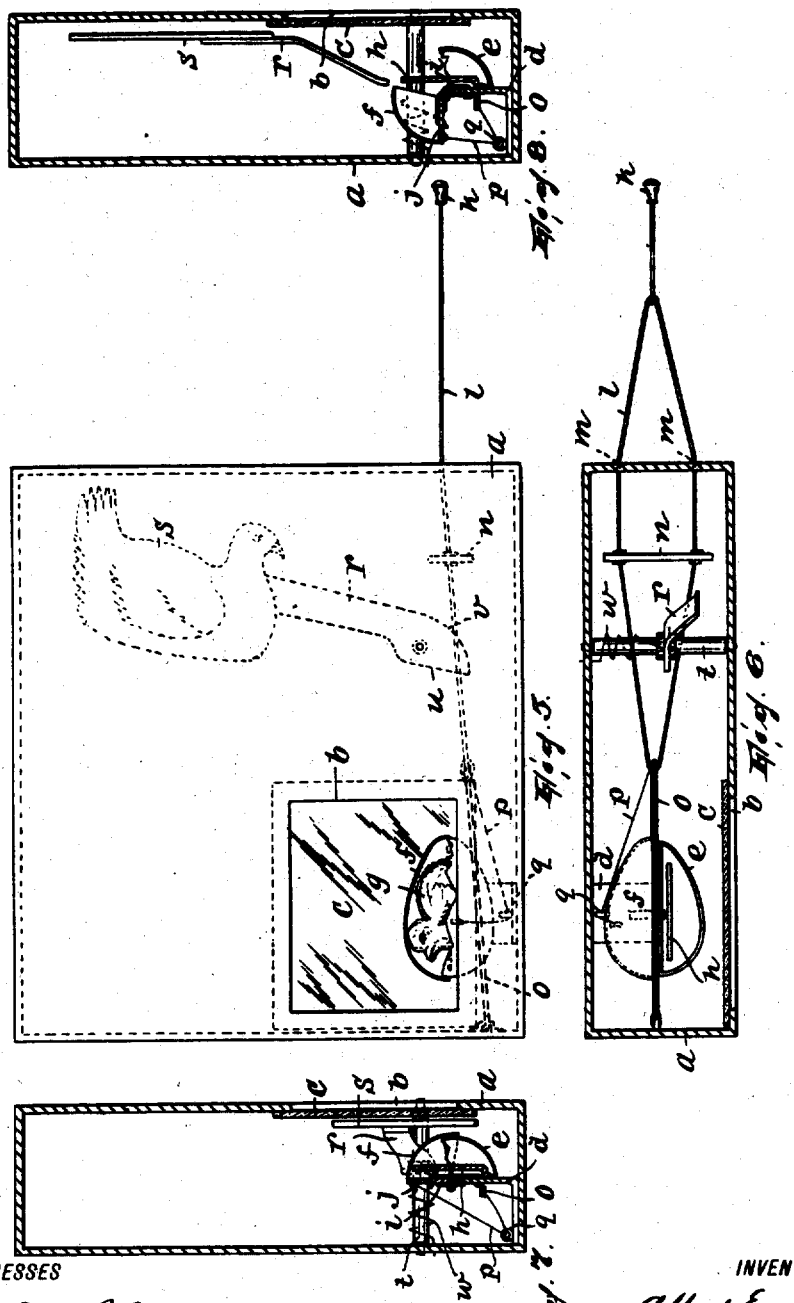
WITNESSES
INVENTOR
Albert Ensor
BY
ATTORNEY.

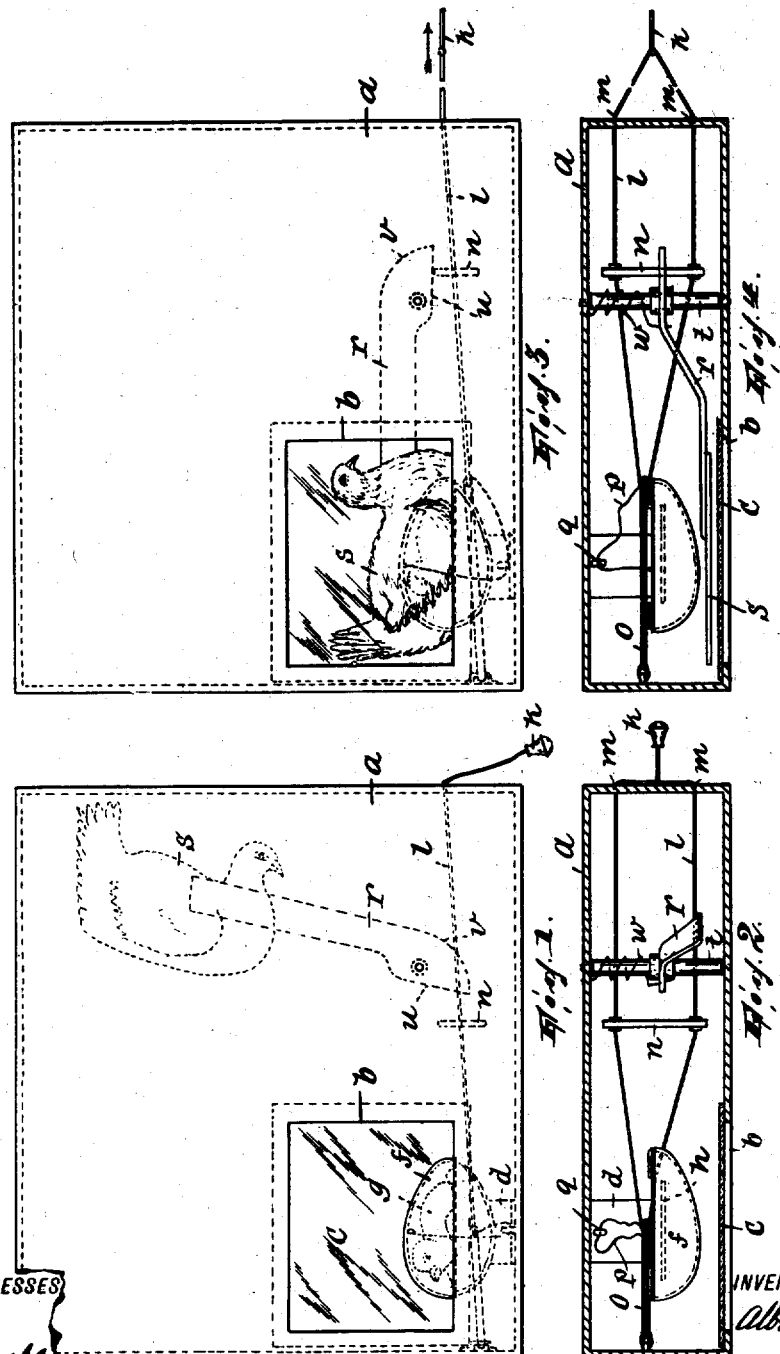

UNITED STATES PATENT OFFICE.

ALBERT ENSOR, OF PATERSON, NEW JERSEY.

TOY.

No. 897,527.　　Specification of Letters Patent.　　Patented Sept. 1, 1908.

Application filed March 30, 1908.　Serial No. 424,110.

*To all whom it may concern:*

Be it known that I, ALBERT ENSOR, a citizen of the United States, residing in Paterson, Passaic county, New Jersey, have invented a certain new and useful Improvement in Toys; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an inexpensive, simple and amusing article of manufacture, which may be operated so as to give the appearance, first, of a hen on her nest, and, second, of an egg in the nest opening and revealing the chick.

The invention will be found fully illustrated in the accompanying drawings, wherein, Figure 1 is a front view of the device showing certain parts in their normal or first position; Fig. 2 is a horizontal sectional plan view taken in a plane just above what represents the egg in Fig. 1; Fig. 3 is a view similar to Fig. 1, but showing the parts in their second position; Fig. 4 is a horizontal sectional plan view of Fig. 3, the plane of section being substantially the same as in Fig. 2; Fig. 5 is a view also substantially similar to Fig. 1 but showing the parts in their third position; Fig. 6 is a horizontal sectional plan view taken in substantially the same plane as Figs. 2 and 4; and, Fig. 7 and 8 are vertical sectional views taken through the egg and showing the parts in the position they occupy in Figs. 3 and 5, respectively.

$a$ is a box having an opening $b$ in one side thereof which may be covered by a piece of transparent glass or the like $c$. On the bottom of the box is arranged a paste-board bracket $d$ carrying the fixed lower half $e$ of what represents an egg shell and having pivotally connected to it the upper half of the egg shell; the upper half is arranged to swing back on its pivot into the position shown in Fig. 8, and when in this position will reveal the chick $g$, which may be pictorially shown on a piece of paste-board $h$ carried by the bracket $d$. The upper half of the shell is normally held in the closed position by the rubber band $i$, which extends up the front of bracket $d$, across the hinge or pivot for the upper shell and then up the front of the back wall $j$ of the upper half of the shell, its ends being secured to the parts $d$ and $j$.

$k$ is a pull connected with a loop $l$ which extends through two holes $m$ in one side of the box, the loop carrying within the box the cross-piece $n$, also formed, preferably of paste-board; the loop is connected with an elastic band $o$ attached to the opposite side of the box, and also attached to the loop is a cord $p$ which extends through an eyelet $q$ and is thereupon connected with the upper half $f$ of the shell, the length of this cord being such that it does not operate on part $f$ until the elastic band $o$ has been considerably extended.

$r$ is a lever which may be formed at its free end to represent a sitting hen $s$ and which is carried by the pivot piece $t$, journaled in the front and back walls of the box; the pivot end of lever $r$ is straight, as at $u$, on the side adjoining the egg (Figs. 1 and 5) and is slightly beveled or rounded, as at $v$, on the other side; in the position indicated in Figs. 1 and 5, in which position the lever is normally held by the spring $w$ coiled about the pivot piece $t$ and having its ends engaging the lever and back wall of the box, the pivot end of said lever projects down through the loop $l$. The free end of the lever is thrust forward, as best shown in Figs. 4 and 8, so that when the lever assumes the position shown in Figs. 3 and 4, the hen $s$ will be positioned in front of the egg.

In operation, the parts being first in the position shown in Fig. 1, when the pull $k$ is drawn outwardly the cross-piece $n$ engages the straight edge $u$ of lever $r$ and thus turns the lever on its pivot, against the tension of spring $w$, so that the hen is brought opposite the opening $b$ and in front of the egg (Fig. 3). On further drawing the pull outwardly, the hen is held in the position shown in Fig. 3 until the cross-piece clears the straight edge $u$ of lever $r$, whereupon the spring $w$ will return the lever $r$ to its original position. On still further drawing outwardly on the pull the cord $p$ is pulled taut and draws up the upper half of the shell, thus revealing the chick. Now on releasing the pull slowly the egg will close under the tension of the elastic band $i$ while the cross-piece, as the loop assumes its original position, will pass back relatively to the lever, wiping around its beveled or rounded edge.

Having thus fully described my invention, what I claim as new and desire to secure by Letters Patent is:

1. The combination of a box having a sight opening, a movable part $f$ disposed within the box opposite the sight opening, and normally held in one position and forming one member of a changeable pictorial representation, an actuating device, a normally slack cord connecting said device and the part $f$, and a part $r$ adapted to move to a position opposite to the opening and controlled by said device and forming another member of said changeable pictorial representation, substantially as described.

2. The combination of a box having a sight opening, a movable part $f$ disposed within the box and normally held in one position and forming one member of a changeable pictorial representation, a normally retracted actuating device, a normally slack cord connecting said device and the part $f$, and a part $r$ adapted to move to a position opposite to the opening and controlled by said device and forming another member of said changeable pictorial representation, substantially as described.

3. The combination of a box having a sight opening, a movable part $f$ disposed within the box and normally held in one position and forming one member of a changeable pictorial representation, a normally retracted actuating device, a normally slack cord connecting said device and the part $f$, and a lever adapted to move to a position opposite to said opening, said lever being normally held retracted but having one end projecting into the path of movement of a part of the actuating device and forming another member of said changeable pictorial representation, substantially as described.

In testimony, that I claim the foregoing, I have hereunto set my hand this 27th day of March, 1908.

ALBERT ENSOR.

Witnesses:
 JOHN W. STEWARD,
 WM. D. BELL.